July 1, 1958  R. M. WILLIAMSON  2,841,164
CONTROL APPARATUS

Filed Feb. 20, 1956  3 Sheets-Sheet 1

INVENTOR.
REGINALD M. WILLIAMSON
BY
ATTORNEY

FIG. 4

INVENTOR.
REGINALD M. WILLIAMSON

Fig. 5

United States Patent Office 2,841,164
Patented July 1, 1958

2,841,164

CONTROL APPARATUS

Reginald M. Williamson, New Hope, Minn., assignor to Minneapolis-Honeywell Regulator Company, Minneapolis, Minn., a corporation of Delaware Application February 20, 1956, Serial No. 566,563

14 Claims. (Cl. 137—98)

The present invention is concerned with control apparatus and more particularly with control apparatus which functions to indicate both the quantity of fuel aboard an aircraft and to control the center of gravity of the aircraft by means of valves which determine the weight distribution of the fuel in the fuel tanks of the aircraft.

In modern aircraft, the speed and range of the aircraft is constantly being increased. The design of this type of an aircraft has resulted in the placing of fuel tanks in spaces within the aircraft which are often far from the desired point of center of gravity of the aircraft. Since a good part of the gross weight of the aircraft consists of fuel, the distribution of this fuel throughout the aircraft has a pronounced effect on the over-all center of gravity of the craft. The basic design of the aircraft yields a mean aerodynamic cord, and in order for the aircraft to be most easily flyable and flyable with the greatest efficiency, the center of gravity of the aircraft must lie in a definite portion of this mean aerodynamic cord. It has been found that it is in some cases possible to have very unstable flight if the center of gravity in the aircraft gets too far out of control.

Therefore, there is a need for center of gravity control of the aircraft. Moreover, it is desirable that this center of gravity control be automatic and continuous so as to not unduly burden the pilot.

It is therefore an object of the present invention to provide an improved apparatus for use with the aircraft to both indicate the quantity of fuel in the aircraft and to control the center of gravity of the aircraft by controlling the distribution of the fuel in the aircraft fuel tanks.

It is a further object of the present invention to provide a control apparatus utilizing a capacitance type tank unit having three coextensive electrodes forming two capacitors, a first of which is a fuel quantity measuring capacitor and the second of which is a fuel moment measuring capacitor, with means to connect these two capacitors in bridge networks to indicate the quantity of fuel in the aircraft and to also control the center of gravity of the aircraft by controlling the distribution of fuel in the fuel tanks.

It is a further object of the present invention to provide an improved control apparatus utilizing a plurality of capacitance type tank units each of which comprises a first and a second capacitor whose capacitance respectively is a function of the fuel quantity and the fuel moment with respect to a given axis of the aircraft, and having a plurality of bridge networks with switch means to connect the first capacitor of each of the tank units to one of the bridge networks and thereby provide indication of the quantity of fuel in the individual tanks, and also a further bridge network including switch means to connect the second capacitors of each of the tank units to opposite sides of this further bridge network to provide a signal indicative of the fuel moment balance with respect to the aircraft axis.

These and other objects of the present invention will be apparent to those skilled in the art upon reference to the following specification, claims, and drawings, of which:

Figure 1:
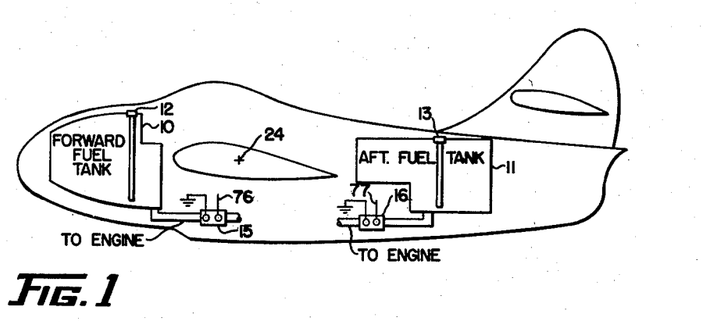
Figure 1 is a silhouette showing of an aircraft, showing the position of forward and aft fuel tanks with capacitance type tank units located therein and with valves controlling the flow of fuel to the aircraft engines from the respective tanks.

Referring specifically to Figure 1, the silhouette outline represents an aircraft having a forward fuel tank 10 and an aft fuel tank 11. The fuel tanks 10 and 11 are arranged to supply fuel through valves 15 and 16 respectively to the aircraft engine, not shown. Located within the fuel tanks 10 and 11 are capacitance type tank units 12 and 13.

Figure 2:
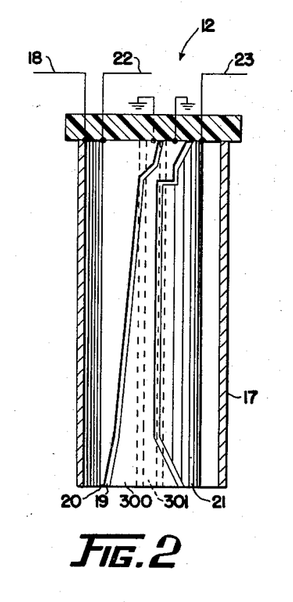
Figure 2 is a representative showing of the tank unit located in the forward tank of the aircraft, showing one possible form which the three capacitor electrodes of the tank unit may take.
Figure 3:
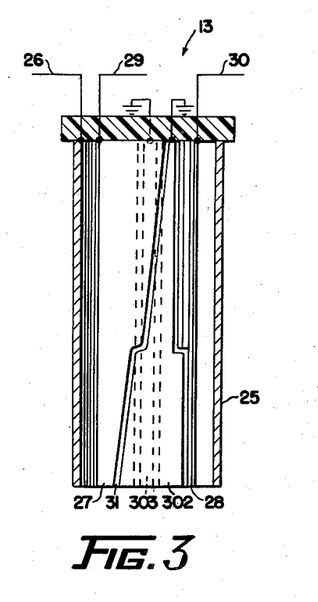
Figure 3 is a showing similar to the showing of Figure 2 of the capacitance type tank unit associated with the aft fuel tank of the aircraft.

The tank units 12 and 13 can be seen in simplified form in the respective Figures 2 and 3 wherein, referring now to Figure 2, the reference numeral 17 designates an outer tubular electrode made of a metal and electrically connected to a conductor 18. Spaced concentrically inside of the electrode 17 is a plastic tube of insulation 19. Two remaining capacitor electrodes 20 and 21 are deposited on the plastic tube 19 made of material which is an electrical insulator, and these electrodes, which are a metal type coating, are connected to the conductors 22 and 23 respectively. The reference numerals 300 and 301 designate grounded metallic coatings which occupy the space between electrodes 20 and 21 but are not electrically connected thereto, a small space or gap being provided between the grounded coating and the electrode. The three capacitor electrodes of the tank unit 12 form two capacitors. The first of these capacitors is a fuel quantity measuring capacitor and includes the common first electrode 17 and the second electrode 20. The electrode 20 is contoured such that the capacitance of this fuel quantity measuring capacitor will vary linearly with the quantity of fuel in the forward tank 10. Since the cross sectional area of the forward tank 10 is not uniform the pattern of the second electrode 20 is irregular.

A second capacitor includes the common first electrode 17 and the third electrode 21. This second capacitor is a fuel moment measuring capacitor since its capacitance is indicative of the moment of the fuel in the forward tank with respect to an axis of the aircraft, for example, axis 24 of Figure 1.

Figure 3 is similar to Figure 2 with the exception that it shows the tank unit 13 located in the aft fuel tank of the aircraft. In Figure 3 the reference numeral 25 designates the first common capacitor electrode which again is a metal tube which is connected to conductor 26. The second capacitor electrode is designated by the reference numeral 27 and again consists of a metal coating which is placed on a plastic tube 31. This second capacitor electrode is connected to conductor 29. The reference numeral 28 designates the third capacitor electrode which likewise is a metal coating deposited on the plastic tube 31. Electrode 28 is connected to conductor 30. The reference numerals 302 and 303 designate grounded metallic coatings which occupy the space between electrodes 27 and 28 but are not electrically connected thereto, a small space or gap being provided between the grounded coating and the electrodes.

In the case of the tank unit 13, the three capacitor electrodes 25, 27, and 28 again form two capacitors. The first of these capacitors consists of the common first electrode 25 and the second electrode 27. This is a fuel quantity measuring capacitor and the capacitance of this capacitor is indicative of the quantity of fuel in the aft tank 11. The second capacitor includes the common first electrode 25 and the third electrode 28. This second capacitor is a fuel moment measuring capacitor since its capacitance is indicative of the moment of the fuel in the aft tank 11 with respect to an axis of the aircraft, for example, axis 24.

The tank units 12 and 13 may be of the general type shown in the Robert A. Meyers copending application Serial No. 192,685, filed October 28, 1950, now Patent 2,741,124, dated April 10, 1956, with the tank units modified to be characterized in a manner to supply both a signal which is indicative of the moment of the fuel in the respective tank with respect to a given axis within the aircraft and a signal indicative of the quantity of fuel.

The above mentioned copending application deals with characterizing a tank unit to be used with an irregular fuel tank so as to obtain equal changes in capacitance of the tank unit for equal changes in fuel quantity. This teaching can be extended to a tank unit such as shown in Figures 2 and 3 wherein one of the patterns, that is electrodes 20 or 27, is characterized in accordance with fuel quantity and the other pattern, that is electrodes 21 or 28, is characterized in accordance with the fuel moment with regard to a particular axis of the aircraft.

Figure 4:
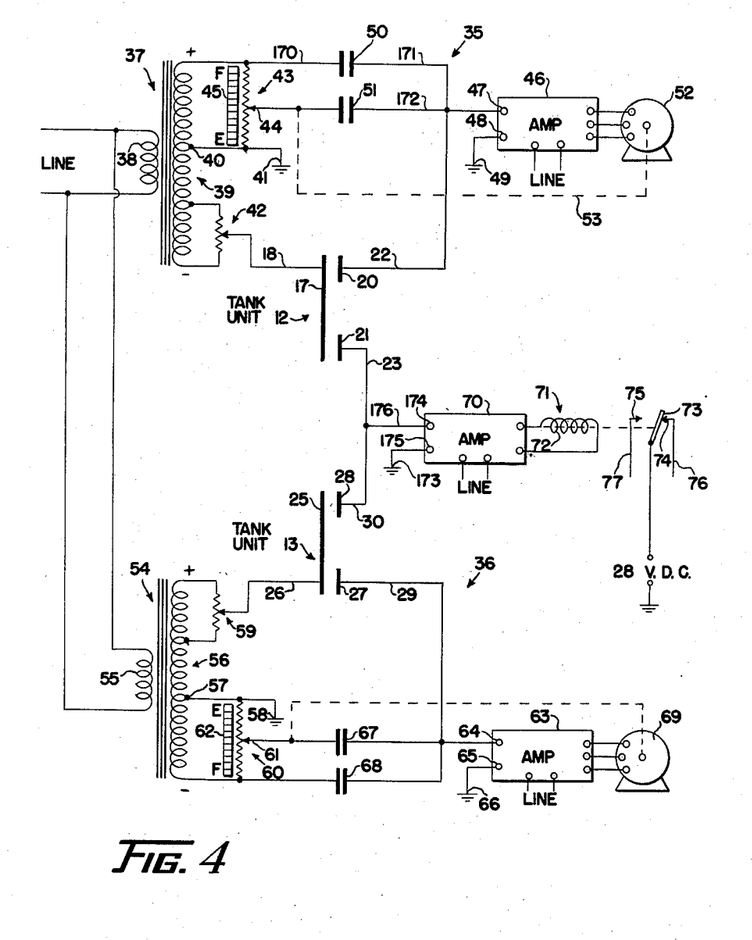
Figure 4 is a schematic showing of a first modification of the present invention.

Referring specifically to Figure 4, a modification of the present invention is shown wherein the tank units 12 and 13 are shown schematically, with the three electrodes of the capacitance type tank units given the same numerical designation as in Figures 2 and 3. In Figure 4, the reference numerals 35 and 36 designate a first and a second fuel quantity measuring network each of which comprises a blanceable capacitance bridge network.

Referring to the bridge network 35, the reference numeral 37 designates a first transformer having a primary winding 38 which is connected to a source of alternating current voltage designated line, and a secondary winding 39 having a tap or terminal 40 which is grounded at ground connection 41.

A calibrating potentiometer 42 is connected across a lower portion of the secondary winding 39 while a rebalance potentiometer 43 is connected across an upper portion of the transformer secondary winding 39.

The potentiometer 43 includes a movable potentiometer tap 44 which cooperates with a fuel quantity indicator scale 45. The indicator scale 45 is calibrated in terms of fuel quantity and the E and F positions on this scale show a position corresponding to the empty and full condition of the tank with which the tank unit 12 is associated, namely the forward tank 10.

The bridge network 35 includes a signal responsive means in the form of an amplifier 46. Amplifier 46 has a pair of input terminals 47 and 48. Input terminal 48 is grounded at ground connection 49 while the input terminal 47 is connected to the second capacitor electrode 20 of the tank unit 12 and to capacitors 50 and 51.

Amplifier 46 is an amplifier of the general type shown on the Albert P. Upton Patent 2,423,534. Amplifier 46 is sensitive to both the phase and to the magnitude of the signal applied to the input of the amplifier. The output of amplifier 46 is a voltage of a first or a second phase depending upon the phase of the voltage applied to the input of the amplifier and this determines the direction of rotation of a motor 52 which is connected by means of a mechanical connection 53 to position potentiometer tap 44.

The capacitor 50 is an empty tank reference capacitor and functions to supply a signal to the input of amplifier 46 which is equal and opposite to that portion of the signal furnished to the input of the amplifier from the tank unit 12, which includes electrodes 17 and 20, when the tank 10 in which this tank unit is located is empty. This feature is more completely described in the copending John W. Bancroft application, Serial No. 181,-747, filed August 28, 1950, now Patent 2,793,529, dated May 28, 1957.

The second fuel quantity measuring network 36 likewise includes a transformer 54 having a primary winding 55 which is connected to the line, and a secondary winding 56 having a first terminal 57 which is grounded at ground connection 58. The reference numeral 59 designates a calibration potentiometer while the reference numeral 60 designates a rebalance potentiometer having a movable potentiometer tap 61 cooperating with a fuel quantity indicator 62 to indicate the quantity of fuel in the aft fuel tank 11 wherein the tank unit 13 is located.

The reference numeral 63 designates an amplifier which may be identical to amplifier 46. Amplifier 63 has a pair of input terminals 64 and 65. Input terminal 65 is grounded at ground connection 66. Input terminal 64 is connected to the second electrode 27 of tank unit 13 and also to the capacitors 67 and 68.

Capacitor 68 functions the same as capacitor 50 of the network 35, above described.

The capacitors 51 and 67 of the balanceable networks 35 and 36 respectively are the rebalance capacitors in the rebalance arm of the bridge. The bridge networks 35 and 36 are rebalanced by means of the motors 52 and 69 which control the position of potentiometer taps 44 and 61 respectively. As the quantity of fuel in the fuel tanks 10 or 11 changes, the capacitance of the first capacitor of the tank units 12 and 13 also changes. Since this first capacitor is connected in the measuring arm of the bridge network the input signal to the amplifier is changed and this results in repositioning of the potentiometer taps to again balance the networks.

Thus far, the explanation has dealt with the measurement of fuel quantity in the forward and aft fuel tanks 10 and 11. The amplifier 70 and its associated apparatus forms the center of gravity control portion of the disclosure of Figure 4. Amplifier 70 is an amplifier which is sensitive only to a signal of a given phase and effects energization of a relay 71 having a winding 72 connected in the output of the amplifier only when a signal of this given phase is applied to the input of the amplifier. For signals of the opposite phase, the relay winding 72 remains de-energized, as it is shown in Figure 4. Upon energization of relay winding 72 the movable switch blade 73 is moved out of engagement with contact 74 and into engagement with contact 75. The contacts 74 and 75 are connected to conductors 76 and 77 respectively, and these conductors are connected to the valves 15 and 16 respectively of Figure 1.

Figure 5:
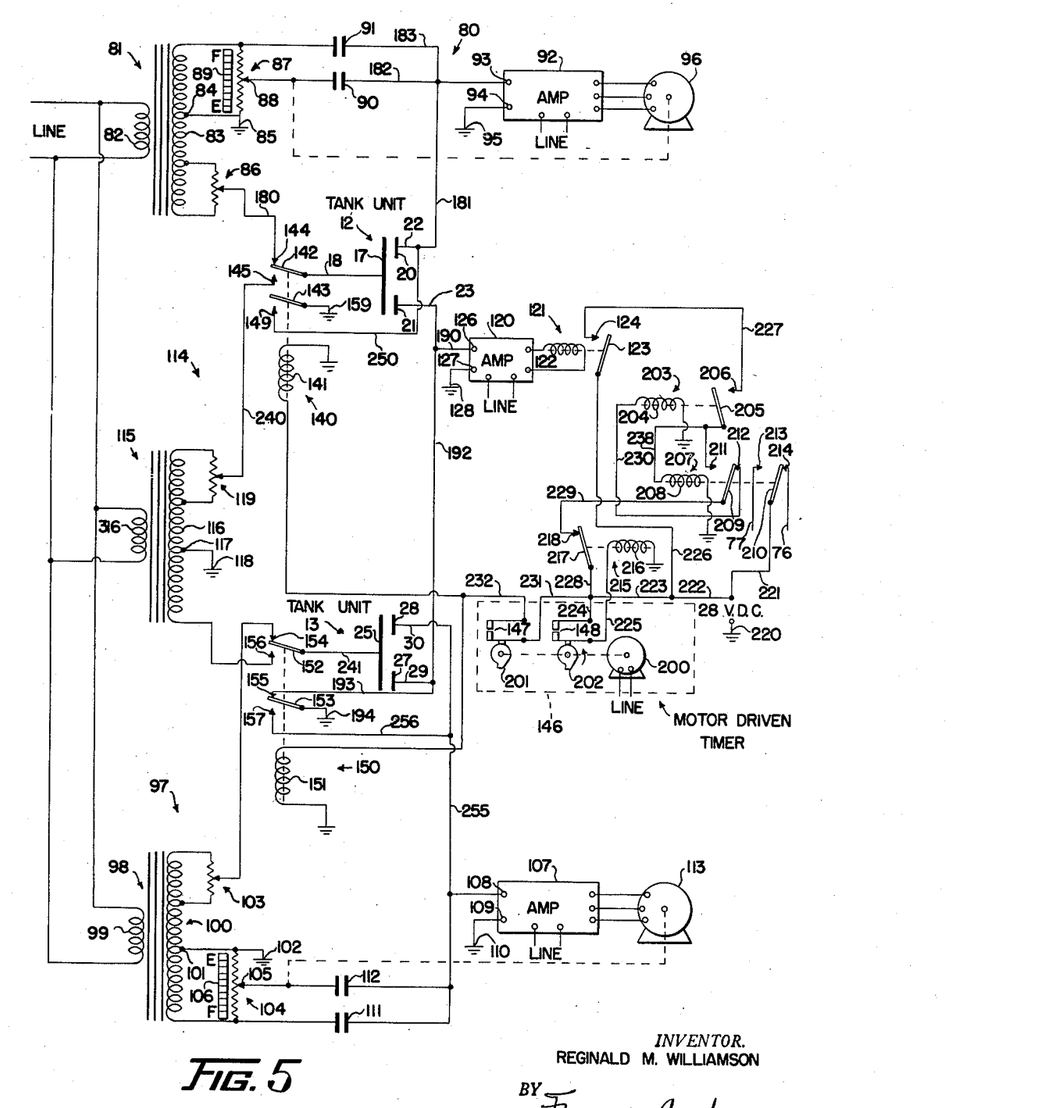
Figure 5 is a schematic showing of a second modification of the present invention.

Referring now specifically to Figure 5, the tank units 12 and 13 are again shown in the same form as shown in Figure 4 and retain like reference numerals.

Figure 5 differs from the disclosure of Figure 4 mainly in that cyclically operated switch means are provided to cycle the common electrodes 17 and 25 of the tank units 12 and 13 respectively between fuel quantity measuring networks and a center of gravity bridge network.

The reference numeral 80 designates a first capacitance type balanceable bridge network. This bridge network has a transformer 81 with a primary winding 82 connected to a source of alternating current voltage designated line, and a secondary winding 83 which has a first terminal or tap 84 connected to ground at terminal 85.

The reference numeral 86 designates a calibration potentiometer. The reference numeral 87 designates a rebalance potentiometer having a movable potentiometer tap 88 and a fuel quantity indicator scale 89 cooperating therewith.

The reference numeral 90 designates a rebalance capacitor which is connected to the potentiometer tap 88. Capacitor 91 is the empty tank reference capacitor for the first capacitor of the tank unit 12 and functions the same as capacitors 50 and 68 of Figure 4, as above described.

Amplifier 92 is identical to the amplifiers 46 and 63 of Figure 4, above described. Amplifier 92 includes a first and a second input terminal 93 and 94 respectively with the input terminal 94 grounded at ground connection 95. A reversible motor 96 is connected in the output of amplifier 92 and controls the position of potentiometer tap 88.

The reference numeral 97 designates the second fuel quantity measuring network comprising a balanceable capacitance bridge. This network includes a transformer 98 having a primary winding 99 which is connected to the line and having a secondary winding 100 with a first terminal or tap 101 grounded at ground connection 102. This network also includes a calibration potentiometer 103 and a rebalance potentiometer 104 having a movable tap 105 and a fuel quantity indicator scale 106 cooperating therewith.

The amplifier designated by the reference numeral 107 is also identical to the amplifiers 46 and 63 of Figure 4, above described. Amplifier 107 has a first and a second input terminal 108 and 109, respectively. Input terminal 109 is grounded at ground connection 110. The input terminal 108 of amplifier 107 is connected to an empty tank reference capacitor 111 and to a rebalance capacitor 112. Here again, the empty tank reference capacitor 111 functions identically to the empty tank reference capacitors 50 and 68 of Figure 4, as above described.

The output of the amplifier 107 includes a reversible motor 113 which is mechanically connected to position the rebalance potentiometer tap 105.

The reference numeral 114 designates generally a center of gravity capacitance bridge network of the apparatus of Figure 5. This bridge network includes a transformer 115 having a primary winding 316 which is connected to the line and a secondary winding 116 having a tap 117 grounded at ground connection 118. A calibration potentiometer 119 is connected across an upper portion of the secondary winding 116. The output of the bridge network 114 includes an amplifier 120. Amplifier 120 is identical to amplifier 70 of Figure 1 and contains a relay 121 having a winding 122 connected in the output thereof. Relay 121 includes a movable blade 123 which is biased out of engagement with a contact 124, by means not shown, and upon energization of winding 122 moves into engagement with the contact 124.

The input of amplifier 120 includes a first input terminal 126 and a second input terminal 127 which is connected to ground at terminal 128. The input terminal 126 of amplifier 120 is connected to the third electrode 21 and the third electrode 27 of the tank units 12 and 13 respectively.

The common electrode 17 of tank unit 12 is cycled between the fuel quantity measuring network 81 and the center of gravity bridge 114 by means of a relay 140 having a winding 141 and movable switch blades 142 and 143. Movable switch blades 142 and 143 are biased, by means not shown, to assume the position shown in Figure 5 when relay winding 141 is de-energized. Upon energization of relay winding 141, the switch blades 142 and 143 move into engagement with contacts 145 and 149 respectively, switch blade 142 then disengaging contact 144.

At the same time that the common electrode 17 of tank unit 12 is cycled between the fuel quantity measuring network 81 and the center of gravity bridge 114, the common electrode 25 of tank unit 13 is cycled between the fuel quantity measuring network 97 and the center of gravity bridge 114. This is achieved by means of a relay 150 having a winding 151 and movable switch blades 152 and 153. The switch blades 152 and 153 are biased by means, not shown, to engage the contacts 154 and 155 when the relay winding 151 is de-energized. Upon energization of the relay winding, the movable switch blades 152 and 153 move into engagement with the contacts 156 and 157 respectively. Relay winding 151 is energized in parallel with relay winding 141 by means of a timer 146. Timer 146 includes switches 147 and 148, cams 201 and 202 and an actuator which is normally connected to the line. Timer 146 operates at approximately three R. P. M., which means that the switches 147 and 148 are alternately opened and closed three times per minute.

Motor 200 controls the rotation of cams 201 and 202 and causes rotation at a rate of three R. P. M. in a counterclockwise direction. Cam 201 has a raised portion covering approximately one-fourteenth of its surface and therefore functions to hold switch 147 closed approximately one-fourteenth of the cycle of operation of the motor-driven timer 146. As will be seen, with switch 147 opened, the common electrodes 17 and 25 of the tank units 12 and 13, respectively, are connected to fuel quantity measuring networks 80 and 97, respectively, and these networks are effective to cause the quantity of fuel in the fuel tanks to be measured. Also, as will be seen, when switch 147 is closed the common electrodes 17 and 25 are connected in opposite sides of the center of gravity bridge network 114 and this bridge network is then effective to compare the fuel moments of the fuel in the forward and aft tanks 10 and 11.

Cam 202 has a raised portion covering approximately one-twentieth of its surface and therefore this cam functions to hold switch 148 closed for one-twentieth of the cycle of the motor-driven timer 146. Also, the raised portions of cams 201 and 202 are so associated as to close switch 147, then close and subsequently open switch 148, and then open switch 147 to complete a single cycle of operation.

Switch 148 functions in combination with relays 121, 203, 207 and 216 to insure that valves 15 and 16 associated with the fuel tanks can be controlled by the center of gravity bridge network 114 only when both switches 147 and 148 are closed. Also when switch 148 opens, these relays insure that the valve which was energized by action of the center of gravity bridge 114 is maintained energized until switch 148 again closes at which time the center of gravity bridge network 114 is once again effective to energize the required one of the valves 15 or 16.

For example, with the apparatus as shown in Figure 5, the valve 15 is energized through a circuit which can be traced from ground connection 220, 28 volt direct current voltage source, conductor 221, switch blade 210 and contact 214, conductor 76, and, now referring to Figure 1, valve 15 to ground. The relay winding 204 of relay 203 is also energized. This energizing circuit can be traced from ground connection 220 through the 28 volt direct current voltage source, conductors 222, 223 and 228, switch blade 217 and contact 218, conductor 229, switch blade 209 and contact 212, conductor 230, and relay winding 204 to ground. This causes switch blade 205 to disengage contact 206.

As cams 201 and 202 advance in a counterclockwise manner, switch 147 closes. This energizes relays 140 and 150 through a circuit which can be traced from ground connection 220, 28 volt direct current voltage source, conductors 222, 223 and 231, switch 147, conductor 232, and parallel connected windings 141 and 151 to ground. With relays 140 and 150 energized, the common electrodes 17 and 25 of the tank units 12 and 13 are connected on opposite sides of the center of gravity bridge network 114. As will be described, this places a signal to the input of amplifier 120 which is indicative of the moment balance of the fuel in the forward and aft fuel tanks with respect to an axis of the aircraft. If the moment of the fuel in tank 10 is greater than the moment of the fuel in tank 11, relay 121 remains de-energized. However, if the moment of the fuel in tank 10 is less than the moment in the fuel tank 11, relay 121 is energized to cause switch blade 123 to engage contact 124.

Assuming the latter case to be true, as the cams 201 and 202 continue to advance switch 148 is closed. This energizes relay winding 216 through a circuit which can be traced from ground connection 220, 28 volt direct current voltage source, conductors 222, 223 and 224, switch 148, conductor 225, and relay winding 216 to ground. Switch blade 217 now moves to the energized position and disengages contact 218.

Switch blade 217 and contact 218 lie in the above traced energizing circuit for relay winding 204. Therefore, energization of relay winding 216 causes relay winding 204 to be de-energized. This causes switch blade 205 to move into engagement with contact 206 completing an energizing circuit for winding 208 of relay 207. This energizing circuit can be traced from ground connection 220 through the 28 volt direct current voltage source, conductors 222 and 226, switch blade 123 and contact 124, conductor 227, contact 206 and switch blade 205, conductor 238, and relay winding 208 to ground.

Energization of winding 208 causes switch blades 209 and 210 to disengage contacts 212 and 214, respectively and to move into engagement with contacts 211 and 213, respectively. Switch blade 209 in engaging contact 211 partially completes a holding energization circuit for winding 208 which will be completed when switch 148 subsequently opens, as will be described.

Switch blade 210 in disengaging contact 214 and engaging contact 213 causes the valve 15 of Figure 1 to be de-energized and the valve 16 to be energized. Contacts 214 and 213 may be overlapping contacts. That is, switch blade 210 in moving either to the energized or the deenergized position may engage one of the contacts before it disengages the other contact, thereby preventing a very short period of time during which either of the valves 15 or 16 would be de-energized.

Since it has been assumed that the moment of the fuel in tank 10 is less than the moment of the fuel in tank 11, the energization of valve 16 causes fuel to be withdrawn from this tank and therefore causes the moment of the fuel in this tank to be reduced.

As the rotation of the cams 201 and 202 continues, the switch 148 opens. This de-energizes relay winding 216 and causes switch blade 217 to engage contact 218. As above mentioned, this completes a holding energizing circuit for the winding 208 of relay 207. This circuit can be traced from the ground connection 220 through the 28 volt direct current voltage source, conductors 222, 223, and 228, switch blade 217 and contact 218, conductor 229, switch blade 209 and contact 211, conductor 238, and relay winding 208 to ground. This circuit will maintain relay winding 208 energized until switch 148 is subsequently closed.

Cams 201 and 202 continue to advance and switch 147 is opened. This causes relays 149 and 150 to be de-energized and the common electrodes 17 and 25 of the tank units 12 and 13 are again returned to the fuel quantity measuring networks 80 and 97, respectively, so that these networks are effective to measure the quantity of fuel in the tanks 10 and 11.

The above describes the manner in which the motor-driven timer 146 along with the relays 121, 203, 207 and 216 function to cause the tank units 12 and 13 to be cycled between fuel quantity measuring networks and a center of gravity measuring network and to insure that whatever fuel valve has been energized during the center of gravity measuring portion of the cycle will be maintained energized until the apparatus once again returns to the center of gravity measuring phase.

Considering now the over-all operation of the apparatus of Figure 4, the capacitance of the fuel quantity measuring capacitors and the fuel moment measuring capacitors of the tank units 12 and 13 is a function of the height of the fuel in the respectively fuel tanks 10 and 11.

Considering first the measurement of the quantity of fuel in the two tanks, the two fuel quantity measuring capacitors, that is electrodes 17 and 20 of tank unit 12 and electrodes 25 and 27 of tank unit 13, are respectively connected in the measuring arms of the rebalanceable capacitance bridges 35 and 36.

Considering first the bridge 35, a first electrical current will flow from ground connection 41 to terminal 40 of transformer secondary 39, calibration potentiometer 42, conductor 18, capacitor electrode 17, capacitor electrode 20, and conductor 22 to the input terminal 47 of amplifier 46. This current will be of a first phase. Currents of the opposite phase will flow to the input of amplifier 46 through the empty tank reference capacitor 50 and the rebalance capacitor 51. The circuit for capacitor 50 can be traced from ground connection 41 to the terminal 40 of transformer secondary 39, the upper portion of transformer secondary 39, conductor 170, capacitor 50, and conductor 171 to input terminal 47 of amplifier 46. The current through rebalance capacitor 51 can be traced from ground connection 41 through the lower portion of the rebalance potentiometer 43, potentiometer tap 44, capacitor 51, and conductor 172 to the input terminal 47 of amplifier 46.

The current flowing through the above traced circuit which includes capacitor 50 balances out the empty tank capacitance of the capacitor made up of electrodes 17 and 20 of tank unit 12. The current flowing through the above traced circuit including the rebalance capacitor 51 balances out the current flowing through the capacitor including the electrodes 17 and 20 of tank unit 12 which is due to the quantity of fuel in the tank 10. As the quantity of fuel in the tank changes, the input signal to amplifier 46 changes and motor 52 is actuated to control the position of potentiometer tap 44 and thereby restore the balance of the capacitance bridge network 35. The position of the potentiometer tap 44 related to the fuel quantity indicating scale 45 then indicates the new quantity of fuel in the tank 10.

The capacitance bridge network 36 functions identical to that of the network 35. That is, the fuel quantity measuring capacitor electrodes 25 and 27, supply a signal indicative of fuel quantity. This signal is rebalanced by empty tank reference capacitor 68 and capacitor 67.

Thus far, the manner in which the quantity of fuel in the respective fuel tanks 10 and 11 is indicated has been explained. A further function which the apparatus of Figure 4 provides is to control the center of gravity of the aircraft of Figure 1. This is done by means of the fuel moment sensing capacitors of the tank units 12 and 13 in conjunction with the amplifier 70 which controls relay 71 and in turn controls the draining of fuel from the tanks 10 and 11.

With the apparatus as shown in Figure 4, the relay winding 72 is de-energized and the switch blade 73 engages contact 74 to energize valve 15 thereby causing fuel to be drained from the forward fuel tank 10. In other words, as the apparatus is functioning in Figure 4 the actual center of gravity of the aircraft is forward of the axis 24 of the aircraft and it is necessary to drain fuel from the tank 10 to restore the center of gravity to the axis 24.

The manner in which amplifier 70 is controlled can be seen by tracing a first circuit from ground connection 41 to transformer secondary tap 40, the lower portion of transformer secondary 39, calibration potentiometer 42, conductor 18, electrode 17 and electrode 21 of tank unit 12, conductor 23, and conductor 176 to the input terminal 174 of amplifier 70. The second input terminal 175 of amplifier 70 is grounded at ground terminal 173 to complete the above traced circuit. A second circuit can be traced from the ground connection 58 to the terminal 57 of transformer secondary winding 56, the upper portion of transformer winding 56, calibration potentiometer 59, conductor 26, electrodes 25 and 28 of tank unit 13, conductor 30, conductor 176, input terminals 174 and 175 of amplifier 70, and ground connection 173.

The two above traced circuits form two arms of a bridge network, each arm of which includes a source of alternating current voltage and a capacitor. The polarities marked on the secondary windings of the transformers 37 and 54 respectively show that the voltages in these above traced circuits are in opposition and therefore the current flowing through the respective fuel moment sensing capacitors of the tank units 12 and 13 are in opposition. Since it has been assumed that the aircraft with the apparatus operating as shown in Figure 4 is presently forward heavy, the fuel moment of the fuel in the forward tank is greater than the fuel moment of the fuel in the aft tank. This means that the capacitance of the fuel moment measuring capacitor of the forward tank, that is electrodes 17 and 21 of tank unit 12, is greater than the capacitance of the fuel moment sensing capacitor, electrodes 25 and 28 of tank unit 13. This causes a signal of a first phase to be applied to the input of amplifier 70. However, amplifier 70 does not respond to this signal and relay winding 72 remains de-energized to cause fuel to be drained from the tank 10.

After a given length of time of draining from the fuel tank 10, the fuel moment of the fuel in the aft tank will be greater than that of the fuel in the forward tank. This causes the capacitance of the fuel moment measuring capacitor of tank unit 13 to be greater than the capacitance of the fuel moment measuring capacitor of tank unit 12. This causes an input signal of the opposite phase to be applied to the input of amplifier 70 and causes relay winding 72 to be energized. Energization of relay winding 72 causes switch blade 73 to disengage contact 74 and to engage contact 75. This de-energizes valve 15 and energizes valve 16 of Figure 1, thereby stopping the draining of fuel to the forward tank 10 and causing fuel to be now drained from the aft tank 11. Contacts 74 and 75 may be overlapping contacts. That is, switch blade 73 in moving from one to the other engages one before disengaging the other.

Operation of the apparatus of Figure 4 continues as above described with the fuel quantity measuring networks 35 and 36 continuously monitoring the quantity of fuel in the tanks 10 and 11 respectively and with the relay 71 alternately being energized and de-energized to maintain the center of gravity of the aircraft within the desired range.

Referring now to the operation of Figure 5, the same basic over-all operation is obtained by modified structure. Here again, the rebalanceable capacitance quantity measuring networks 80 and 97 indicate the quantity of fuel in the tanks 10 and 11 respectively while the relay 121 is alternately energized and de-energized to maintain the center of gravity of the aircraft within a desired range.

Referring first to the operation of the network 80, a circuit through the measuring arm of the bridge can be traced from ground connection 85 through the lower portion of transformer secondary 83, calibration potentiometer 86, conductor 180, contact 144 and switch blade 142 of relay 140, conductor 18, electrodes 17 and 20 of tank unit 12, conductor 22, and conductor 181 to the input terminal 93 of amplifier 92. The above traced circuit is completed to ground through input terminal 94 and ground connection 95. This above traced circuit applies to the input circuit of amplifier 92 a current which is of a first phase and of a magnitude indicative of the quantity of fuel in the tank 10.

The rebalance arm of the bridge 80 can be seen by tracing a first circuit from ground connection 85 through the lower portion of rebalance potentiometer 87, capacitor 90, and conductor 182 to the input terminal 93 of amplifier 92. A second circuit can be traced from ground connection 85 through the upper portion of transformer secondary 83, capacitor 91, and conductor 183 to the input terminal 93 of amplifier 92. The above two traced circuits through capacitors 90 and 91 respectively apply a signal of a phase opposite to the first phase to the input of amplifier 92. The current which flows through capacitor 91 is equal and opposite to the current which flows due to the empty tank capacitance of the measuring capacitor of tank unit 12. The current which flows through capacitor 90 is equal and opposite to the current which flows through the measuring capacitor of tank unit 12 due to the quantity of fuel in the tank 10. As the quantity of fuel in the tank 10 changes, a signal is applied to the input of amplifier 92 and the motor 96 is actuated to reposition the potentiometer tap 88 of rebalance potentiometer 87 and thereby restore the condition whereby the current through the capacitors 90 and 91 is equal and opposite to the current through the capacitor made up of electrodes 17 and 22 of tank unit 12. Therefore, the potentiometer tap 88 in cooperation with the fuel quantity indicator scale 89 indicates the quantity of fuel in the forward fuel tank 10 of the aircraft.

The operation of the fuel quantity measuring network 97 is substantially identical to that above described with respect to the network 80 with the exception that the measuring arm of the network is controlled by switch blade 152 of relay 150 and includes the fuel quantity measuring capacitor of tank unit 13, that is electrodes 25 and 28. Also, the potentiometer tap 105 of rebalance potentiometer 104 in cooperation with the fuel quantity indicator scale 106 continuously monitors the quantity of fuel in the aft fuel tank 11.

The center of gravity bridge network, generally designated by the reference numeral 114, will now be described. In the apparatus of Figure 5, the relays 140 and 150 are shown in their de-energized position. The center of gravity in network 114 is not effective at this time. In fact, the input terminal 126 of amplifier 120 is connected to ground. This circuit can be seen by tracing from input terminal 126 through conductors 190, 192, and 193, contact 155 and switch blade 153, and ground connection 194. As above described, when the raised portion of the cam 201 closes the switch 147 of the motor-driven timer 146, the relays 140 and 150 are energized.

Energization of these two relays connects the common electrodes 17 and 25 of the tank units 12 and 13 respectively on opposite sides of the center of gravity bridge network 114. The two output terminals of this bridge network consist of the ground connection 118 and the input terminal 126 of amplifier 120. The two legs of the bridge can be seen by first tracing a circuit from the ground connection 118 to the tap 117 of transformer secondary 116, the upper portion of transformer secondary 116, calibration potentiometer 119, conductor 240, contact 145 and switch blade 142, conductor 18, electrode 17 and electrode 21 of tank unit 12, conductor 23, and conductor 190 to input terminal 126. The second circuit which consists of the other leg of the bridge can be traced from the ground connection 118 to the tap 117 of transformer secondary 116, the lower portion of transformer secondary 116, contact 156 and switch blade 152, conductor 241, electrodes 25 and 27 of tank unit 13, and conductors 29, 192 and 190 to input terminal 126.

The bridge circuit thus formed applies signals of opposite phase to the input of amplifier 120 which are of the magnitude indicative of the moment of the fuel in the tanks 10 and 11. The apparatus of Figure 5 is shown with relay 121 de-energized, as it will remain when relays 140 and 150 are energized if the moment of the fuel in the forward tank is greater than the moment of the fuel in the aft tank. This causes valve 15 to be energized to drain the forward tank.

As has been described, the action of the center of gravity bridge 114 as it controls relay 121 is not effective until the raised portion of the cam 202 closes the switch 148. If it is assumed that the relay 121 is energized due to the moment of the fuel in the aft tank now being greater than the moment of fuel in the forward tank, switch blade 123 engages contact 124. However, at this time the winding 204 of relay 203 is energized and no circuit can be completed until this relay winding is de-energized.

As has been described, relay winding 204 is de-energized when the raised portion of cam 202 closes switch 148 to energize the winding 216 of relay 215. This action causes the winding 204 of relay 203 to be de-energized and switch blade 205 moves into engagement with contact 206. This in turn establishes an energizing circuit for the winding 208 of relay 207 and causes the valve 15 to be de-energized and the valve 16 to be energized. This causes fuel to be drained from the aft fuel tank to reduce the moment of the fuel in the aft fuel tank. Also as has been described, relay 207 completes a holding energization circuit through its switch blade 209 and contact 211 which causes winding 208 to be maintained energized when the motor-driven timer 146 again de-energizes relays 140 and 150 to return the common electrodes of the tank units 12 and 13 to the fuel measuring networks 80 and 97 respectively. This insures that the center of gravity action which was initiated by the fuel moment unbalance of the forward and aft tanks will be maintained until the center of gravity bridge network 114 is again rendered operative to change which one of the valves 15 and 16 is energized if such action is necessary. In other words, the only time that the valves 15 and 16 can be initially energized or de-energized is when the raised portion of the cam 202 holds the switch 148 closed.

The relays 140 and 150 perform an additional function in that they ground out the input of the amplifiers 92 and 107 respectively of the fuel quantity measuring networks 80 and 97. Referring to the amplifier 92, this circuit can be seen by tracing a circuit from input terminal 93 through conductor 181, conductor 250, contact 149 and switch blade 143, and ground connection 159. Referring to amplifier 107 this circuit can be traced from input terminal 108 through conductors 255 and 256, contact 157 and switch blade 153, and ground connection 194. Therefore it can be seen that when the fuel quantity measuring networks 80 and 97 are effective the input to the center of gravity bridge network amplifier 120 is shorted. Likewise, when the center of gravity bridge network 114 is active the input to the amplifiers 92 and 107 of the fuel quantity measuring network are rendered inoperative. This tends to hold the motors 96 and 103 at a stable condition and prevent hunting of the motors. From above, it can be seen that I have provided an improved control apparatus which provides for both fuel quantity measurement and center of gravity action. Other modifications of the present invention will be apparent to those skilled in the art and it is intended that the scope of the present invention be limited solely by the appended claims.

I claim as my invention:

1. Apparatus for use with an aircraft having a first and a second fuel tank located on opposite sides of an axis of the aircraft about which the center of gravity is to be maintained, comprising: a first and a second measuring capacitor arranged to be positioned in the first and second fuel tanks respectively and having capacitor electrodes extending throughout the height of the fuel tanks, the capacitance value of said first and second capacitors being a function of the height of fuel in the individual fuel tanks; a first and a second rebalanceable capacitance bridge network each having a measuring arm and having a rebalance arm which includes a capacitor and an indicator calibrated in terms of fuel quantity, means connecting said first and second measuring capacitors in the measuring arms of said first and second bridge networks respectively so as to cause the indicator of said first and second bridge networks to indicate the quantity of fuel in the first and second fuel tanks respectively; a center of gravity capacitance bridge, and means connecting said first and second measuring capacitors in opposite legs of said center of gravity bridge, the condition of balance of said center of gravity bridge thereby being a function of the center of gravity of the fuel in the first and second fuel tanks with respect to the aircraft axis.

2. Apparatus for use with an aircraft having a first and a second fuel tank located on opposite sides of an axis of the aircraft, comprising: a first and a second measuring capacitor unit arranged to be positioned in the first and second fuel tanks respectively, said measuring capacitor units each having three electrodes extending throughout the height of the tanks and forming two capacitors each having a pair of electrodes, a first of said capacitors having a capacitance value which is a function of the quantity of fuel in each individual tank, and a second of said capacitors having a capacitance value which is a function of the moment of the fuel in each individual tank with respect to the aircraft axis; a first and a second balanceable capacitance bridge, each bridge having a measuring arm, a rebalance arm having a variable source of voltage and a capacitor, and means including a fuel quantity indicator connected to the output of said bridge and arranged to control said variable source of voltage to rebalance said bridge; means connecting said first capacitor of said first and second measuring capacitor units respectively to the measuring arm of said first and second bridge to thereby cause the indicator of said first and second bridges to indicate the quantity of fuel in the first and second fuel tanks; a further capacitance bridge, means connecting said second capacitor of said first and second measuring capacitor units respectively in opposite arms of said further capacitance bridge so that the condition of balance of said further capacitance bridge is a function of the moment balance of the fuel in the first and second fuel tanks about the aircraft axis; and means responsive to the condition of balance of said further capacitance bridge.

3. Apparatus for use with an aircraft having a first and a second fuel tank, comprising: a first and a second measuring unit each of which is arranged to be located in one of the fuel tanks, each of said measuring units having three coextensive capacitor electrodes forming a quantity measuring capacitor and a moment measuring capacitor having a common electrode; a first and a second transformer, each having a secondary winding having end terminals and a grounded tap; means connecting the common electrode of said first measuring unit to an end terminal of said first transformer secondary which is of a first phase, means connecting the common electrode of said second measuring unit to an end terminal of said second transformer secondary which is of a phase opposite to said first phase; a first and a second rebalance capacitor; means connecting said first rebalance capacitor in a variable voltage connection to the other end terminal of said first transformer secondary and to the other electrode of said quantity measuring capacitor of said first measuring unit, means connecting said second rebalance capacitor in a variable voltage connection to the other end terminal of said second transformer secondary and to the other electrode of said quantity measuring capacitor of said second measuring unit; a first and a second amplifier each having a pair of input terminals one of which is grounded and each having an output circuit including a motor and a fuel quantity indicator; means connecting the other input terminal of said first amplifier to the connection of said first rebalance capacitor and the other electrode of said quantity measuring capacitor of said first measuring unit, means coupling the motor in the output circuit of said first amplifier to control the variable voltage connection of said first rebalance capacitor and to control its indicator to indicate the quantity of fuel in the first fuel tank; means connecting the other input terminal of said second amplifier to the connection of said second rebalance capacitor and the other electrode of said quantity measuring capacitor of said first measuring unit, means coupling the motor in the output circuit of said second amplifier to control the variable voltage connection of said second rebalance capacitor and to control its indicator to indicate the quantity of fuel in the second fuel tank; a third amplifier having a pair of input terminals one of which is grounded, means connecting the other input terminal of said third amplifier to the other electrodes of said moment measuring capacitor of said first and second measuring units to thereby apply a signal to the input of said third amplifier which is indicative of the moment unbalance of the fuel in the fuel tanks; and means connected to the output of said third amplifier and controlled in accordance with the moment unbalance.

4. Apparatus for use with an aircraft having a first and a second fuel tank located on opposite sides of an axis of the aircraft, comprising: a first and a second three electrode capacitance type tank unit arranged to be positioned in the first and second tanks respectively, each of said tank units having three capacitor electrodes which form a first and a second capacitor with a common electrode, the capacitance value of the first capacitor being indicative of fuel quantity and the capacitance value of the second capacitor being indicative of fuel moment about the aircraft axis; a first and a second fuel quantity measuring network each of which has a fuel quantity indicator, means connecting the first capacitor of said first and said second tank units to said first and second fuel quantity measuring networks respectively to cause the indicators of said first and second fuel quantity measuring networks to indicate the quantity of fuel in the first and second tanks respectively; a center of gravity responsive network, and means connecting the second capacitor of said first and said second tank units to said center of gravity responsive network to cause the output of said center of gravity responsive network to be indicative of the condition of moment balance of the first and second fuel tank with respect to the aircraft axis.

5. Control apparatus for use with an aircraft having a pair of fuel tanks located on opposite sides of an axis of the aircraft, comprising: a first and a second tank unit arranged to be located one in each of the fuel tanks, each of said tank units having three coextensive capacitor electrodes forming two capacitors having a common electrode and with fuel as dielectric, a first capacitor of which has a capacitance value indicative of fuel quantity while the second capacitor has a capacitance value indicative of fuel moment with respect to the aircraft axis; first and second balanceable capacitance type bridge networks, each having an amplifier whose input is connected to the output of the bridge network and whose output controls the bridge to balance the same and to indicate the quantity of fuel in one of the fuel tanks; a further capacitance type bridge network having an amplifier whose input is connected to the output of the further bridge network and whose output is indicative of the condition of moment balance of the fuel in the tanks with respect to the aircraft axis; cycling switch means, means controlled by said cycling switch means alternately connecting said first capacitors of said first and second tank units respectively to said first and second bridge networks and then connecting said second capacitors of said first and second tank units on opposite sides respectively of said further bridge network; and means controlled by said switch means to alternately short out the input circuit of said further bridge network amplifier and then short out the input circuits of said first and second bridge network amplifiers.

6. Apparatus for use on aircraft having a pair of fuel tanks located one on each side of an axis of the aircraft, comprising: a first tank unit arranged to be positioned in one of the fuel tanks, said first tank unit having three coextensive capacitor electrodes which extend throughout the height of the tank, said three capacitor electrodes forming a first capacitor between a first and a second electrode and a second capacitor between said first and a third electrode, the capacitance value of said first capacitor being indicative of the quantity of fuel in the one fuel tank and the capacitance value of said second capacitor being indicative of the moment of the fuel in the one fuel tank with respect to the aircraft axis; a first electronic amplifier having an input, a first source of alternating current voltage, means connecting said first source of alternating current and said amplifier input in series to said first and second electrodes of said first tank unit so that the output of said first amplifier is indicative of the quantity of fuel in the one fuel tank; a second tank unit arranged to be positioned in the other of the fuel tanks, said second tank unit having three coextensive capacitor electrodes which extend throughout the height of the tank, said three capacitor electrodes forming a first capacitor between said first and second electrodes and a second capacitor between said first and a third electrode, the capacitance value of said first capacitor being indicative of the quantity of fuel in the other fuel tank and the capacitance value of said second capacitor being indicative of the moment of the fuel in the other fuel tank with respect to the aircraft axis; a second amplifier having an input, a second source of alternating current voltage, means connecting said second source of alternating current voltage and said amplifier input in series to said first and second electrodes of said second tank unit so that the output of said second amplifier is indicative of the quantity of fuel in the other fuel tank; a third amplifier having an input, a third and a fourth source of alternating current voltage which are of opposite phase; means connecting said third source of alternating current voltage and said first and third electrodes of said first tank unit in series to the input of said third amplifier; and means connecting said fourth source of alternating current voltage and said first and third electrodes of said second tank unit in series to the input of said third amplifier, whereby the output of said third amplifier is indicative of the moment of the fuel in the two tanks with respect to the aircraft axis.

7. Apparatus for use with an aircraft having a pair of fuel tanks located one on each side of an axis of the aircraft, comprising: a first and a second tank unit each of which is arranged to be positioned in one or the other of the fuel tanks respectively, said tank units each having three coextensive capacitor electrodes which extend throughout the height of the tank, said three capacitor electrodes forming a first capacitor between a first and a second electrode and a second capacitor between said first and a third electrode, the capacitance value of said first capacitor being indicative of the quantity of fuel in the fuel tank and the capacitance value of said second capacitor being indicative of the moment of the fuel in the fuel tank with respect to the aircraft axis; a first electronic amplifier having a pair of input terminals one of which is grounded, a first source of alternating current voltage having a first terminal which is grounded and having a second terminal of a first phase, means connecting said second terminal of said first source of alternating current voltage and said first and second electrodes of said first tank unit in a series circuit to the other input terminal of said first amplifier, so as to cause the output of said first amplifier to be indicative of the quantity of fuel in the fuel tank in which said first tank unit is located; a second amplifier having a pair of input terminals a first of which is connected to ground, a second source of alternating current voltage having a first terminal which is grounded and having a second terminal which is of a phase opposite from said first phase, means connecting said second terminal of said second source of alternating current voltage and said first and second electrodes of said second tank unit in a series circuit to said second input terminal of said second amplifier, so as to cause the output of said second amplifier to be indicative of the quantity of fuel in the fuel tank in which said second tank unit is located; a third amplifier having a pair of input terminals, a first of which is grounded; means connecting said third electrode of said first tank unit and said third electrode of said second tank unit to said second input terminal of said third amplifier to thereby cause the output of said third amplifier to be indicative of the moment of the fuel in the two tanks with respect to the aircraft axis.

8. Apparatus for use with an aircraft having a pair of fuel tanks located one on each side of an axis of the aircraft, comprising: a first and a second tank unit each of which is arranged to be positioned in one of the fuel tanks of the aircraft, said first and second tank units each having three coextensive capacitor electrodes which extend throughout the height of the tanks, said three capacitor electrodes forming a first capacitor between a first and a second electrode and forming a second capacitor between the common first electrode and a third electrode, the capacitance value of said first capacitor being indicative of the quantity of fuel in the fuel tank and the capacitance value of said second capacitor being indicative of the moment of the fuel in the fuel tank with respect to the aircraft axis; a first transformer secondary winding having a grounded terminal and a second terminal having a voltage thereon of a first phase, a second transformer secondary winding having a grounded terminal and a second terminal with the voltage thereon of an opposite phase, a third transformer secondary winding having a first grounded terminal and second and third terminals of said first and said opposite phase respectively; switching means, means including said switching means alternately connecting the first common electrode of said first and second tank units to said second terminals respectively of said first and second transformer secondary windings and then to said second and third terminals respectively of said third transformer secondary winding; a first amplifier having a pair of input terminals a first of which is grounded and the second of which is connected to the second electrode of said first tank unit, the output signal of said first amplifier thereby being indicative of the quantity of fuel in one of the fuel tanks; a second amplifier having a pair of input terminals one of which is grounded and the other of which is connected to the second electrode of said second tank unit, the output of said second amplifier thereby being indicative of the quantity of fuel in the other fuel tank; and a third amplifier having a pair of input terminals one of which is grounded and the other of which is connected to the third electrode of said first and said second tank units, the output of said third amplifier thereby being indicative of the moment of the fuel in the fuel tanks with respect to the axis of the aircraft.

9. Apparatus for use with an aircraft having a pair of fuel tanks located one on each side of an axis of the aircraft, comprising: a first and a second tank unit arranged to be positioned one in each of the fuel tanks, said first and second tank units having three coextensive capacitor electrodes which extend throughout the height of the tank, said three capacitor electrodes forming a first capacitor between a first and a second of the three electrodes and forming a second capacitor between the common first electrode and a third electrode, the capacitance value of said first capacitor being indicative of the quantity of fuel in the fuel tank and the capacitance value of said second capacitor being indicative of the moment of the fuel in the tank with respect to the aircraft axis; a first source of alternating current voltage having a first grounded terminal and having a second terminal, a second source of alternating current voltage having a first grounded terminal and a second terminal, a third source of alternating current voltage having a first grounded terminal and a second and third terminal which are of opposite phases; switch means, means controlled by said switch means alternately connecting said common first electrode of said first and second tank units, respectively first to the second terminal of said first and second source of alternating current voltage and then to the second and third terminals of said third source of alternating current voltage; a first amplifier having a pair of output terminals one of which is grounded and the other of which is connected to the second electrode of said first tank unit; a second amplifier having a pair of output terminals the first of which is grounded and the second of which is connected to the second electrode of said second tank unit; a third amplifier having a pair of input terminals a first of which is grounded and the second of which is connected to the third electrode of said first and second tank units; and further means controlled by said switch means rendering said third amplifier inoperative when said first electrode of said first and second tank units respectively are connected to the second terminals of said first and second source of alternating current voltage, and rendering said first and second amplifiers inoperative when said first electrode of said first and second tank units respectively are connected to said second and third terminals of said third voltage source.

10. Apparatus for use with a craft having a first and a second load whose magnitude can be controlled, with the loads located on opposite sides of an axis of the craft about which it is desired to control the center of gravity of the craft, comprising; first and second measuring means arranged to measure the respective quantities of the controllable first and second loads and moments of said first and second loads about the axis, a first and a second measuring network, means connecting said first and second measuring means, when responsive to the quantities of the loads, to said said first and second measuring networks respectively so as to cause the outputs of said first and second measuring networks to indicate the quantity of the respective first and second loads; a center of gravity network, and means connecting said first and second measuring means, when responsive to the moments of the loads, to said center of gravity measuring network, the output of said center of gravity measuring network thereby being a function of the center of gravity of the controllable loads; and means responsive to the output of said center of gravity network to control the magnitude of the first and second controllable loads to thereby maintain the center of gravity of the craft.

11. Apparatus for use with a craft having a first and a second load whose magnitude can be controlled, with the loads located on opposite sides of an axis of the craft about which it is desired to control the center of gravity of the craft, comprising: first and second measuring means arranged to be responsive to the magnitude of the controllable first and second loads and to the moment of the first and second loads about the axis; quantity measuring network means; center of gravity network means; means selectively connecting said first and second measuring means first to said measuring network means to cause the output of said measuring network means to be indicative of the quantity of the first and second loads, and second to said center of gravity network means to render the output of said center of gravity network means responsive to the moments of the controllable loads; and means responsive to the output of said center of gravity network means to control the magnitude of said first and second controllable loads to thereby maintain the center of gravity of the craft.

12. Control apparatus for use with an aircraft having a pair of fuel tanks located on opposite sides of an axis of the aircraft, comprising: a first and a second measuring unit arranged to be located one in each of the fuel tanks responsive to fuel quantity and to the moment of the fuel with respect to the axis, fuel quantity measuring network means, center of gravity measuring network means, cycling switch means, means controlled by said cycling switch means alternately connecting said first and second fuel measuring units first to said fuel quantity measuring network means and then to said center of gravity measuring network means so as to cause the output of said fuel quantity measuring network means to be indicative of the quantity of fuel in the fuel tanks and to cause the output of said center of gravity measuring network means to be indicative of the center of gravity of the aircraft.

13. Control apparatus for use with an aircraft having a pair of fuel tanks located on opposite sides of an axis of the aircraft, comprising: a first fuel tank, first sensing means in said tank adapted to give a first signal indicative of the quantity of fuel in said tank and to give a second signal indicative of the moment of the fuel in said tank about the axis; indicating means responsive to the first signal from said sensing means to indicate the quantity of fuel in said tank; a second fuel tank; second sensing means in said second tank adapted to give a first signal indicative of the quantity of fuel in said second tank and to give a second signal indicative of the moment of fuel in said second tank about the axis, second indicating means responsive to the first signal from said second sensing means to indicate the quantity of fuel in said second tank; and network means responsive to the combined second signals from said first and second sensing means and having an output indicative of the center of gravity of the aircraft.

14. Apparatus for use with a craft having first and second loads, whose magnitudes can be controlled, with the loads located on opposite sides of an axis of the craft about which it is desired to control the center of gravity, comprising: a first measuring means associated with the first load and adapted to give a first signal indicative of the magnitude of the first load and a second signal indicative of the moment of the first load with respect to the axis; indicating means responsive to the first signal from said first measuring means to indicate the magnitude of the first load; a second measuring means associated with the second load and adapted to give a first signal indicative of the magnitude of the second load and a second signal indicative of the moment of the second load with respect to the axis; indicating means responsive to the first signal from said second measuring means to indicate the magnitude of the second load; and network means connected to said first and second measuring means and responsive to the combined second signals from said first and second measuring means to control the magnitudes of the first and second loads to thereby maintain the center of gravity of the craft.

References Cited in the file of this patent

UNITED STATES PATENTS

| | | |
|---|---|---|
| 2,478,671 | Smith | Aug. 9, 1949 |
| 2,509,629 | De Giers et al. | May 30, 1950 |
| 2,672,880 | Hermanson | Mar. 23, 1954 |
| 2,759,424 | Defibaugh et al. | Aug. 21, 1956 |